United States Patent
Mollinari

(10) Patent No.: US 7,319,887 B2
(45) Date of Patent: Jan. 15, 2008

(54) HOLDER FOR A CLAMSHELL-TYPE MOBILE PHONE

(75) Inventor: Maurizio Mollinari, Munich (DE)

(73) Assignee: Sony Ericsson Mobile Communications AB, Lund (SE)

( * ) Notice: Subject to any disclaimer, the term of this patent is extended or adjusted under 35 U.S.C. 154(b) by 213 days.

(21) Appl. No.: 10/543,112

(22) PCT Filed: Nov. 27, 2003

(86) PCT No.: PCT/EP03/14680

§ 371 (c)(1),
(2), (4) Date: Dec. 19, 2005

(87) PCT Pub. No.: WO2004/065175

PCT Pub. Date: Aug. 5, 2004

(65) Prior Publication Data

US 2006/0180726 A1  Aug. 17, 2006

(30) Foreign Application Priority Data

Jan. 23, 2003  (EP)  .................................. 03001560

(51) Int. Cl.
*H04B 1/38* (2006.01)
(52) U.S. Cl. ................ 455/557; 455/550.1; 455/569.1; 455/575.1; 379/433.13; 379/455; 379/445; 320/115; 320/114
(58) Field of Classification Search ................ 455/557, 455/550.1, 569.1, 569.2, 575.1, 575.9, 90.3; 379/422.13, 454, 455
See application file for complete search history.

(56) References Cited

U.S. PATENT DOCUMENTS

| 5,189,358 A | 2/1993 | Tomura et al. ................. 320/2 |
| 6,009,168 A | 12/1999 | Snyder et al. ............... 379/466 |
| 6,993,369 B2 * | 1/2006 | Asakura ...................... 455/573 |
| 2002/0176571 A1 * | 11/2002 | Louh ........................... 379/455 |

FOREIGN PATENT DOCUMENTS

EP   0 980 792   2/2000

OTHER PUBLICATIONS

International Preliminary Examination Report for PCT/EP03/14680.
International Search Report for PCT/EP03/14680.

* cited by examiner

*Primary Examiner*—Lester G. Kincaid
*Assistant Examiner*—Dung Lam
(74) *Attorney, Agent, or Firm*—Myers Bigel Sibley & Sajovec

(57) ABSTRACT

The present invention relates to a holder for a clamshell-type mobile phone with two parts connected to each other and foldable onto each other by a hinge. The holder includes a holding structure having two opposing sidewalls for releasably holding one part of the mobile phone. The holder includes a lower sidewall with a connector configured to connect to a corresponding connector of the mobile phone. The two opposing sidewalls and the lower sidewall together define an inside portion of the holding structure. The two opposing sidewalls respectively include a protruding element protruding towards the inside portion of the holding structure and configured to engage into respective apertures of the hinge of the mobile phone.

10 Claims, 2 Drawing Sheets

HOLDER FOR A CLAMSHELL-TYPE MOBILE PHONE

RELATED APPLICATIONS

Figure 1:
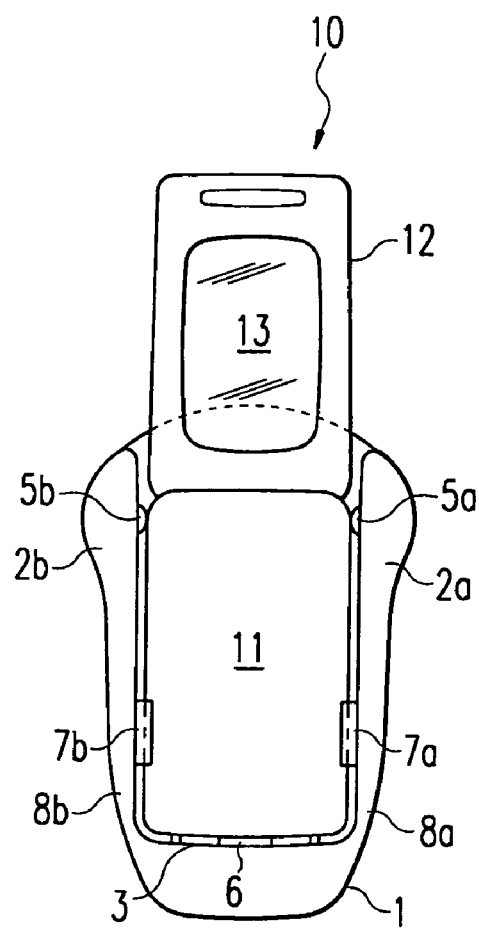

The present application is a 35 U.S.C. §371 national phase application of PCT International Application No. PCT/EP03/014680, having an international filing date of Nov. 27, 2003 and claiming priority to European Patent Application No. 03001560.6, filed Jan. 23, 2003, the disclosure of which is incorporated herein by reference in its entirety. The above PCT International Application was published in the English language and has International Publication No. WO 04/065175.

The present invention relates to a holder for a clamshell-type mobile phone, specifically a holder that can be used as a car cradle for receiving and holding a clamshell-type mobile phone in an automobile or car.

Such holders for mobile terminals or car cradles are generally known in the state of the art. Such holders are normally fixedly connected to the loudspeaker and radio system of the car interior as well as to an external antenna and to a microphone for picking up acoustic speech information from the driver or one of the passengers. Hereby, a driver can have a telephone communication without having to hold the mobile phone to his or her ear. Usually, the holder or car cradle comprises a snap-in mechanism or clamping mechanism or the like, so that a mobile phone is securely fixed but can be released in an easy and simple manner by pushing a button or the like. However, such holders known in the prior art are only able to accommodate normal mobile phones and not clamshell-type mobile phones. A clamshell-type mobile phone is a telephone comprising a first part and a second part, whereby the first part and the second part are connected to each other via a hinge means and whereby the first and the second part can be folded together and on top of each other so that the size of the mobile phone is significantly reduced while the phone is carried around. In order to activate the speech functions or other functions of the mobile phone, the first part and the second part are flipped open. Such type of mobile phones usually have to be flipped open in order to enable a telephone conversation.

The object of the present invention is therefore to provide a holder for a clamshell-type mobile phone which ensures a simple but reliable accommodation of a clamshell-type mobile phone in its flipped open state.

The above object is achieved by a holder for a clamshell-type mobile phone according to claim 1. The mobile phone has a first part and a second part connected to each other and foldable onto each other by a hinge means. The holder according to the present invention comprises a holding structure having a left and a right sidewall for releasably holding said first part of the mobile phone and a lower wall with a connector for a connection to a corresponding connector of the mobile phone, whereby the left and the right sidewall respectively comprise a protruding element protruding towards the inside of the holding structure and adapted to engage into respective apertures of the hinge means of the mobile phone.

Hereby, the clamshell-type mobile phone can be easily connected to the holder by connecting the connector of the mobile phone to the connector of the holder on the lower wall and then by locking the mobile phone into the holding structure by pressing the mobile phone between the left and right sidewall so that the respective protrusion enters the apertures or openings in the hinge means. Hereby, a firm and reliable phone retention and accommodation is ensured in a simple way.

Advantageously, the protruding elements are made of an elastic material, such as thermoplastic rubber, so that the surface and casing of the mobile phone is not scratched when the phone is inserted in the holding structure. Further, the sidewalls can be made of an elastic material so that the clamping of the mobile phone into the holding structure and the releasing of the mobile phone from the holding structure can be achieved by simply bending one of the sidewalls or both sidewalls outwardly, so that the mobile phone can be taken out easily.

Advantageously, the connector on the lower wall of the holding structure is at the same time a data input/output connector to be connected to a corresponding data input/output connector of the mobile phone. Hereby, the input/output connector of the holding structure advantageously projects from the lower wall and engages into a corresponding input/output connector aperture of the mobile phone when the phone is inserted in the holding structure. Hereby, by means of a slight pivoting movement, the phone, after the input/output connectors have been connected, is pivoted inbetween the sidewalls so that the protrusions can engage into the aperture of the hinge means on both sides of the mobile phone. By this slight pivotal movement, the mobile phone is further advantageously connected to an RF connector projecting from a backwall of the holding structure in order to connect the mobile phone to an external antenna.

Further advantageously, the supporting structure comprises an upper support for the second part of the mobile phone in its flipped-open position. This support ensures that the mobile phone can rest in its flipped open position while being accommodated in the holding structure. In an advantageous embodiment, the sidewalls with the protruding elements as well as the support are formed so that the second part of the mobile phone can be flipped onto the first part while being held in the holding structure, so that the mobile phone can be closed while being held.

Further advantageously, the holding structure comprises a lower right and a lower left sidewall between the lower wall and the left and the right sidewall, respectively. The lower sidewalls respectively comprise additional protruding elements protruding to the inside. These additional protruding elements can additionally secure the first part of the mobile phone in the holding structure. Advantageously, these additional protruding elements are of an elastic material, such as rubber.

The present invention also comprises a combination of a holder as described above with a clamshell-type mobile phone comprising respective apertures as the hinge means connecting the first part and the second part of the mobile phone. Hereby, the hinge means can be a single hinge extending across the entire width of the mobile phone or can consist of two separate hinges on the left and the right side of the mobile phone. However, the hinge axis of the hinge or both hinges are recessed towards the inside so that an aperture is formed in to which the protrusions of the sidewalls of the holding structure can engage. Additionally, the hinge means may advantageously comprise guiding means to ensure that the protrusions are correctly guided into the apertures upon inserting the mobile phone into the holding structure. Hereby, a correct alignment is ensured so that upon inserting the mobile phone into the holdings structure, the connector means of the phone and the holding structure can first be connected, whereafter the phone is guided with a slight pivotal movement into the holding structure under the assistance of the guiding means. The guiding means at the same time ensure that a correct alignment and connection of the RF plug projecting from the backwall of the holding structure into a corresponding socket in the backwall of the mobile phone is ensured. Thus, the combination of the connectors, the guiding means, the protrusions and the apertures ensure a proper vertical alignment when the phone is inserted into the holding structure. This guiding can be further supported by the additional protruding elements on the lower sidewalls in co-operation with corresponding recesses in the sidewalls of the mobile phone. Hereby, at the beginning of the insertion of the mobile phone, the recesses of the mobile phone are engaged by the additional protruding elements. Towards the end of the inserting procedure, the additional protruding elements leave the recesses and clamp the mobile phone by pressing against the sidewalls of the mobile phone.

Figure 2:
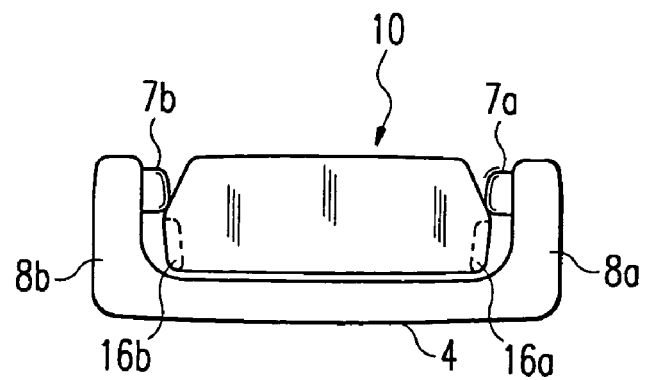
Figure 3:
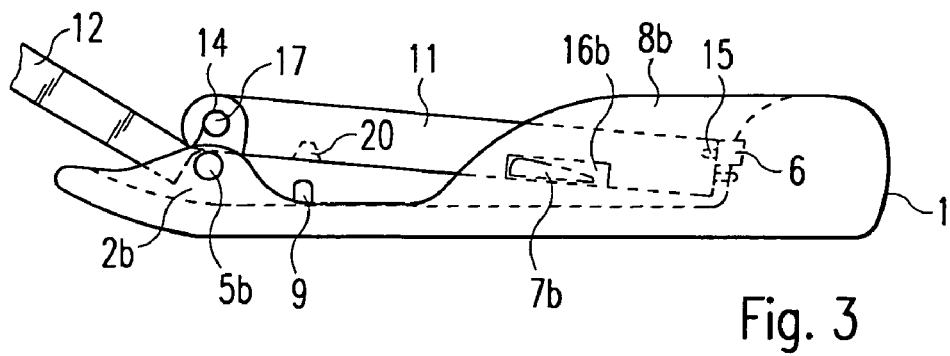
Figure 4:
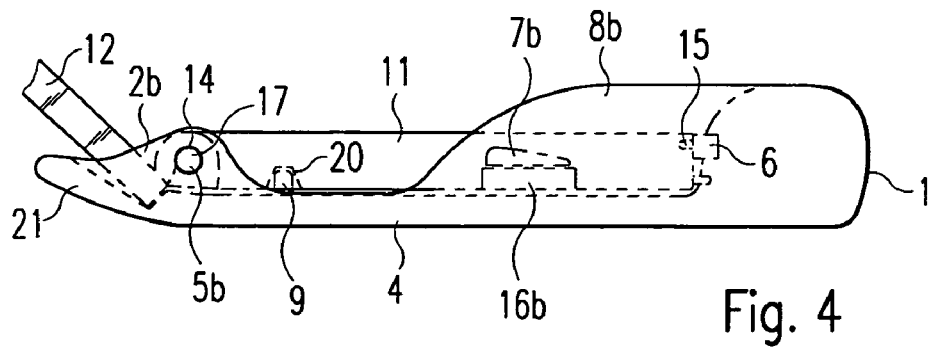
Figure 5:
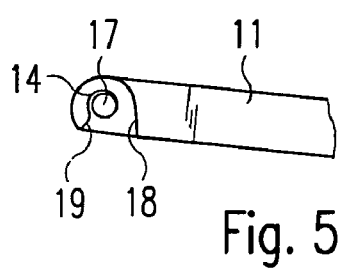
Figure 6:
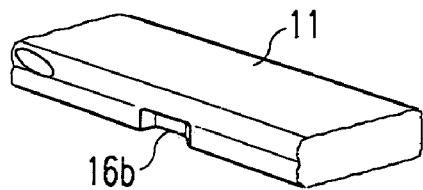

An advantageous embodiment of the present invention is explained in the following description in relation to the enclosed drawings, in which FIG. 1 shows a schematic top view onto a clamshell-type mobile phone inserted into a holder according to the present invention, FIG. 2 shows a cross-section of the lower side walls and a first part of a mobile phone FIG. 3 shows a schematic side view of a holder according to the present invention while a mobile phone is being inserted, FIG. 4 shows a schematic side view of a holder according to the present invention into which a clamshell-type mobile phone in a flipped-open state is fully inserted, FIG. 5 shows an enlarged schematic view of the hinge means connecting the first and the second part of the clamshell-type mobile phone and FIG. 6 shows schematically a recess on the first part of the mobile phone for the co-operation with the additional protruding elements of the holding structure.

FIG. 1 schematically shows a top view of a holder 1 according to the present invention, into which a clamshell-type mobile phone 10 is inserted. The holder 1 consists essentially of a plastic material.

The holder 1 is adapted to receive and accommodate a clamshell-type mobile phone 10 comprising a first part 11 and a second part 12. The first part 11 and the second part 12 of the mobile phone 10 are connected to each other with a hinge 14 as e.g. shown in FIGS. 3 and 5. The first part 11 of the mobile phone 10 usually comprises a keyboard and the second part 12 of the mobile phone 10 usually comprises a display. The holder 1 of the present invention is adapted to receive the clamshell-type mobile phone 10 in a flipped-open state as shown in FIG. 1.

Important elements for holding the mobile phone 10 are the right sidewall 2a and the left sidewall 2b, whereby the directions right and left are not limiting and only related to the view in FIG. 1. The sidewalls 2a and 2b extend upwardly from a backwall 4 of the holder 1. The lower part of the holder 1 is formed by a lower wall 3 comprising a data input/output connector 6 to be connected with a corresponding data input/output connector aperture of the mobile phone 10. The lower wall 3 can comprise further holding pins projecting to the inside adapted to engage into corresponding holes in the mobile phone so that additional holding stability is ensured.

When the phone is to be inserted into the holder 1, the lower side of the first part 11 of the mobile phone 10 is connected with the data input/output connector 6 whereafter the phone is pressed with a slight pivotal movement between the sidewalls 2a and 2b. Each sidewall 2a, 2b, respectively, comprises a protrusion 5a, 5b, i.e. a thermoplastic knob pointed to the inside of the holder 1. The protrusions 5a and 5b are adapted to engage into respective apertures 17 formed in the hinge 14 connecting the first and the second part of the mobile phone 10.

FIG. 3 shows a schematic sideview of the first step of the insertion of the mobile phone 10 into the holder 1, namely after the data input/output connector 6 of the holder 1 had been inserted into the data input/output connector aperture 15 of the mobile phone but before the protrusions 5a and 5b engage into the apertures 17 of the hinges 14. This insertion movement is supported by additional protrusions 7a and 7b, respectively extending inwards from lower sidewalls 8a and 8b of the holder 1. These additional protrusions engage into recesses 16a and 16b on both sides of the first part 11 of the mobile phone 10 at the beginning of the insertion step as shown in FIG. 3. Hereby, a proper vertical alignment of the mobile phone 10 in the holder 1 is ensured, so that an RF plug extending from the backwall 4 of the holder 1 is correctly connected to and inserted in an RF connection socket 20 on the backside of the mobile phone 10.

FIG. 4 shows a schematic sideview of the mobile phone 10 being fully inserted into the holder 1, i.e. in a state in which the protrusions 5a and 5b engage the apertures 17 in the hinge 14. Also, the RF plug 9 is properly inserted in the RF socket 20. The additional protrusions 7a and 7b have, in this fully inserted state, left the recessions 16a and 16b, respectively, and provide additional clamping of the first part 11 of the mobile phone 10 as shown in the cross-section in FIG. 2.

In FIG. 5, a schematic view of the hinge 14 connecting the first and the second part of the mobile phone 10 is shown with additional guiding means 18 and 19 for guiding the respective protrusion 5a or 5b into the aperture 17 of the hinge 14. Hereby, the guide means 18 and 19 are e.g. formed by small wall structures having a opening into which a protrusion 5a or 5b enters and is guided towards the aperture 17 by the approaching wall structures 18, 19. The aperture 17 is formed by a recession of the hinge axis 14. This enables that the mobile phone 10, while being held in the holder 1, can still be opened or closed without problem. As shown in FIG. 4, second part 12 of the mobile phone 10, in the flipped-open and inserted state, is supported by a support structure 21 extending upwardly from the backwall 4.

FIG. 6 shows a schematic respective view of the first part 11 of the mobile phone with the recession 16b for the co-operation with the additional protrusion 7b.

It has to be noted, that the entire holder 1 is advantageously made of plastics, but can be made of any other material. The protrusions 5a, 5b and the additional protrusions 7a, 7b are advantageously made of an elastic material, such as thermoplastic rubber, in order to ensure that the phone casing or other parts are not damaged while the phone 10 is being inserted into the holder 1. Further, the holder 1 can have a certain elasticity around a vertical axis or the sidewalls, so that the mobile phone can be easily removed from the holder 1 by bending the sidewalls 2a and 2b and the lower wall parts 8a and 8b away from each other. Hereby, the sidewalls 2a and 2b and the lower walls parts 8a and 8b can be formed and operate as springs clamping the phone into the holder 1 after insertion but allowing for an easy removal of the phone 10 when bent away from each other by a user.

The invention claimed is:

1. A holder for a clamshell-type mobile phone with a first part and a second part connected to each other and foldable onto each other between a flipped-open state and a flipped-close state by a hinge means,
the holder comprising:
a holding structure having first and second opposing sidewalls for releasably holding the first part of the mobile phone, the holding structure having a lower sidewall between the first and second sidewalls with a connector configured to releasably connect to a corresponding connector of the mobile phone, the first, second and lower sidewalls together defining an inside portion of the holding structure, wherein the first and second sidewalls respectively comprise a protruding element protruding towards the inside portion of the holding structure and adapted to engage into respectively apertures of the hinge means of the mobile phone.

2. A holder for a clamshell-type mobile phone according to claim 1, wherein the protruding elements are made of an elastic material.

3. A holder for a clamshell-type mobile phone according to claim 1 that wherein the first and second opposing sidewalls are formed as elastic elements configured to exert a clamping force on a mobile phone inserted in the inside portion of the holding structure.

4. A holder for a clamshell-type mobile phone according to claim 1, wherein the connector of the holder is a data input/output connector protruding from the lower sidewall of the holding structure.

5. A holder for a clamshell-type mobile phone according to claim 1, wherein the lower sidewall comprises a first lower sidewall, the holder further comprising second and third lower sidewalls provided between the first and second opposing sidewalls and the first lower sidewall, respectively, the second and third lower sidewalls respectively comprising an additional protruding element, for clamping the first part of a mobile phone in the inside portion of the holding structure.

6. A holder for a clamshell-type mobile phone according to claim 5, wherein the additional protruding elements of the second and third lower sidewalls are made of an elastic material.

7. A holder for a clamshell-type mobile phone according to claim 5, wherein the second and third lower sidewalls are formed as elastic elements configured to exert a clamping force on a mobile phone inserted into the holding structure.

8. A holder for a clamshell-type mobile phone according to claim 1, further comprising a support wall configured to support the second part of a mobile phone inserted into the inside portion of the holding structure and being in a flipped-open state.

9. A holder and clamshell-type mobile phone assembly, the assembly comprising:
a clamshell-type mobile phone with a first part and a second part connected to each other and foldable onto each other by a hinge means,
a holder comprising a holding structure having first and second opposing sidewalls configured to releasably hold the first part of the mobile phone, the holding structure having a lower sidewall with a connector configured to connect to a corresponding connector of the mobile phone, the first, second and lower sidewalls together defining an inside portion of the holding structure, wherein the first and second opposing sidewalls respectively comprise a protruding element protruding towards the inside portion of the holding structure,
wherein the hinge means of the mobile phone comprises apertures into which the protruding elements of the holder are configured to engage upon and releasably connect the mobile phone to the holder.

10. The assembly of claim 9, wherein the hinge means of the mobile phone comprises guiding means configured to guide the protruding elements of the first and second opposing sidewalls into the apertures of the hinge means of the mobile phone.

* * * * *

UNITED STATES PATENT AND TRADEMARK OFFICE
CERTIFICATE OF CORRECTION

PATENT NO. : 7,319,887 B2  Page 1 of 1
APPLICATION NO. : 10/543112
DATED : January 15, 2008
INVENTOR(S) : Mollinari It is certified that error appears in the above-identified patent and that said Letters Patent is hereby corrected as shown below:

In the claims:

Column 5, Claim 3, Line 24: After "to claim 1" please delete "that"

Signed and Sealed this

Third Day of June, 2008

JON W. DUDAS
*Director of the United States Patent and Trademark Office*